US006829813B2

(12) United States Patent
Zennamo et al.

(10) Patent No.: US 6,829,813 B2
(45) Date of Patent: Dec. 14, 2004

(54) METHOD OF INSTALLING AN ELECTRICAL SIGNAL FILTER

(75) Inventors: Joseph A. Zennamo, Skaneateles, NY (US); Joseph N. Maguire, Syracuse, NY (US)

(73) Assignee: Eagle Comtronics, Inc., Clay, NY (US)

( * ) Notice: Subject to any disclaimer, the term of this patent is extended or adjusted under 35 U.S.C. 154(b) by 0 days.

(21) Appl. No.: 10/371,553

(22) Filed: Feb. 21, 2003

(65) Prior Publication Data

US 2003/0134539 A1 Jul. 17, 2003

Related U.S. Application Data

(63) Continuation of application No. 09/641,989, filed on Aug. 18, 2000, now abandoned.

(51) Int. Cl.$^{7}$ .................................................. H01S 4/00
(52) U.S. Cl. .......................... 29/592.1; 29/521; 29/729; 29/739; 29/758; 29/764; 29/876; 439/133; 439/306; 439/307; 439/546; 439/578
(58) Field of Search ................................ 29/592.1, 729, 29/739, 758, 764, 876, 521, 825.11; 439/133, 306, 307, 546–548, 578

(56) References Cited

U.S. PATENT DOCUMENTS 4,053,195 A 10/1977 Laverick et al. ............ 439/589
5,032,091 A 7/1991 Itzkoff ......................... 439/620
5,208,568 A 5/1993 Sassin ......................... 333/223
5,329,687 A 7/1994 Scott et al. ................ 29/527.2
5,662,489 A 9/1997 Stirling ...................... 439/308
5,662,494 A 9/1997 Zennamo, Jr. et al. ...... 439/141
6,261,110 B1 7/2001 Hatazawa ................... 439/322

FOREIGN PATENT DOCUMENTS

JP 08213811 A 8/1996 ............ H01P/7/08

OTHER PUBLICATIONS

"Partial discharge on power cables using linear prediction"; Bidhendi, H.N.; Qi Su; Properties and Applications of Dielectric Materials, 1997., Proceedings of the 5th International Conference on, vol.: 1, May 25–30 1997; pp. 406–409.

Photographs of a South Wold commerical filter.

*Primary Examiner*—A. Dexter Tugbang
*Assistant Examiner*—Paul Kim
(74) *Attorney, Agent, or Firm*—Burr & Brown

(57) ABSTRACT

An electrical signal filter housing of the type including a threaded female connector adapted to mate with a hexagonal cable connector having a span X, the filter housing including a cylindrical body having a span Y, which is substantially greater than X, a threaded female connector portion having a base connected to a first end of the cylindrical body, a male connector portion connected to a second, opposed end of the cylindrical body, and a drive member disposed proximate the base of the threaded female connector portion, the drive member having a span substantially equal to X.

5 Claims, 1 Drawing Sheet

METHOD OF INSTALLING AN ELECTRICAL SIGNAL FILTER

CROSS REFERENCE TO RELATED APPLICATION

This application is a continuation application of U.S. application Ser. No. 09/641,989 filed Aug. 18, 2000, the entirety of which is incorporated herein by reference.

FIELD OF THE INVENTION

The present invention relates to an electrical signal filter used in the cable industry, and in particular, an electrical signal filter housing including a drive member that facilitates easy installation of the filter to another device using a commonly available tool.

BACKGROUND OF THE INVENTION

Various types of filters are used in the cable industry to manage signals transmitted via a cable line. For example, high pass filters are used to prevent the ingress of noise from individual subscriber's televisions into the cable system, which noise would adversely affect the signal supplied to cable internet subscribers. As high pass filters require relatively simple circuitry, the housing that encloses the circuitry can be relatively small. In fact, some high pass filter manufacturers have made the housing in the shape of a hexagon having a span of 7/16", to match the span of the hexagonal nut used on typical F-connectors used to terminate cable lines. As a result, the same 7/16" wrench used to secure the F-connector to the filter can also be used to install the high pass filter to another device, such as a splitter.

Another type of filter used in the CATV industry is referred to as a notch or trap filter. This type of filter is used, for example, to add a scrambling signal to or remove a scrambling signal from a transmitted cable signal, to control a subscriber's access to certain subscription channels. As the circuitry involved with such trap filters is much more complex compared to high pass filters, the filter housing tends to be substantially larger in diameter and length. The industry has adopted a circular filter housing having a diameter ranging from 3/4" to 1", to provide sufficient room to enclose the electronic components of trap filters.

One example of such a trap filter is shown in FIG. 1, which corresponds to FIG. 9 of U.S. Pat. No. 5,662,494, the entirety of which is incorporated herein by reference. FIG. 1. shows that the female connector end 1 of the filter housing includes two holes 2*a*, 2*b*, which are designed to receive a special tool that rotates the housing so that the male end 3 of the filter housing can be secured to another device, such as a directional tap or another filter in a cascading setup. While this technique is quite effective to provide a tight threaded connection between the male end 3 of the housing and the other device, it requires a special tool.

In addition, when a coaxial cable connector is secured to the female connector end 1 of the filter housing using a 7/16" wrench, for example, the torque imposed on the housing by the wrench will also affect the torque at the male end of the housing. That is, if the torque imposed by the wrench exceeds that used to secure the housing to the other device, then the torque imposed by the wrench will be transmitted to the male end of the housing. This increased torque could be excessive with respect to the receiving hole of the device in which the male end of the housing is secured, which in turn could damage the other device.

In an effort to provide selective torque control at both ends of the filter housing, a channel lock wrench could be used to hold the outer surface of the filter housing while the cable connector is secured to the housing. However, in many filters, the outer housing can turn independent of the threaded female connector. Moreover, use of a channel lock wrench damages the outer surface of the filter, which can lead to corrosion, and, in extreme cases affects the electrical performance of the filter.

An alternative to using a channel lock wrench would be to form the outer filter housing in the shape of a hexagon having a span of 1", for example. In this way, an installer could use an open end 1" wrench to rotate the housing and secure it to another device at a predetermined torque. That same wrench could then be used to hold the filter housing and a 7/16" wrench could be used to secure an F-connector-terminated cable on the threaded female connector portion of the filter housing. However, forming the filter housing in the shape of a hexagon is generally more expensive than using regular cylindrical tube stock, which is standard practice in the trap filter industry. Moreover, in cases where torque control is not a concern, such a filter housing would still require the use of two different tools to complete installation.

It would be desirable to provide a filter housing having a diameter exceeding 7/16", that can be installed on another device using the same tool used to secure the cable connector to the filter, while also providing torque control at both ends of the filter housing.

SUMMARY OF THE INVENTION

It is an object of the present invention to overcome the above-discussed drawbacks with the prior art.

A first embodiment of the present invention provides an electrical signal filter housing of the type including a threaded female connector adapted to mate with a hexagonal cable connector having a span X, the filter housing comprising a body having a span Y, which is substantially greater than X, a threaded female connector portion having a base connected to a first end of the body, a male connector portion connected to a second, opposed end of the body, and a drive member disposed proximate the base of the threaded female connector portion, the drive member having a span substantially equal to X.

Preferably, the drive member includes at least two flat sides in substantial parallel relation to one another, and the span, X, between the two flat sides is equal to 7/16". More preferably, the drive member is hexagonal and X is equal to 7/16".

In accordance with a preferred method of the present invention, an electrical signal filter is installed between another device and a cable terminated with a cable connector having a span X, a housing of the electrical signal filter having a span Y which is substantially greater than X and a threaded female connector portion at one end thereof, the method comprising the steps of:

(a) providing a tool having an engaging span substantially equal to X;

(b) using the tool to engage a drive member, having a span X, positioned proximate the threaded female connector portion of the filter housing;

(c) rotating the filter housing to secure the filter to another device;

(d) using the same tool to engage the cable connector terminating the cable; and (e) rotating the cable connector to secure the cable to the filter.

More preferably, the method further includes, between steps (c) and (d), the steps of:

(i) providing a second tool having an engaging span substantially equal to X;

(ii) using the second tool to engage the drive member; and (iii) holding the second tool to prevent substantial rotation of the filter during step (e).

The electrical signal filter housing and installation method of the present invention allow the use of a conventional tool, such as a 7/16" wrench, to secure the housing to another device, while also allowing for torque control at both ends of the housing. Accordingly, a 7/16" wrench can be used to secure the housing to another device, and then the same 7/16" wrench can be used to secure the cable connector to the threaded female connector portion of the housing. If it is desired to maintain the level of torque at the male end of the filter housing independent of the torque imposed on the female end of the housing, then another 7/16" wrench can be used to hold the filter housing while the cable connector is being secured to the housing.

The present invention eliminates the need for a special tool to install the filter housing to another device, and also provides for selective torque control at both the male and female ends of the filter housing. This not only simplifies filter installation, but also provides a simple and efficient way to control installation torque at both ends of the filter housing that heretofore has not been available.

BRIEF DESCRIPTION OF THE DRAWINGS

For a full understanding of the nature and objects of the invention, reference should be made to the following detailed description of a preferred mode of practicing the invention, read in connection with the accompanying drawings, in which.

DETAILED DESCRIPTION OF THE INVENTION

Figure 1:
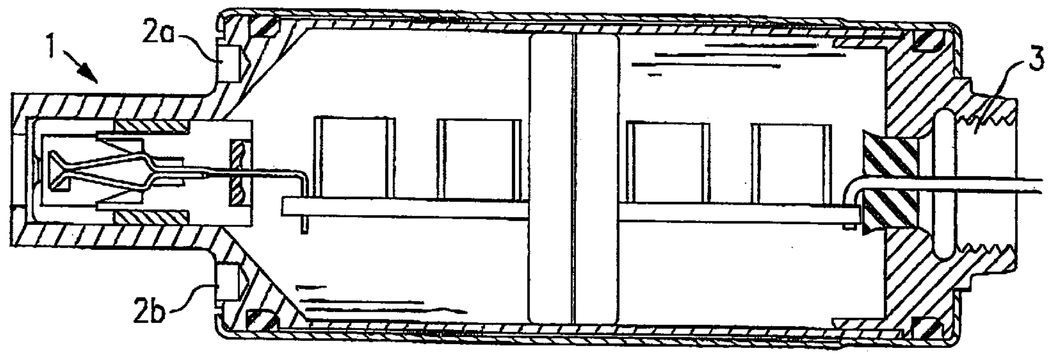
FIG.1 Prior Art
FIG. 1 is a cross-sectional view of a prior art filter.
Figure 2:
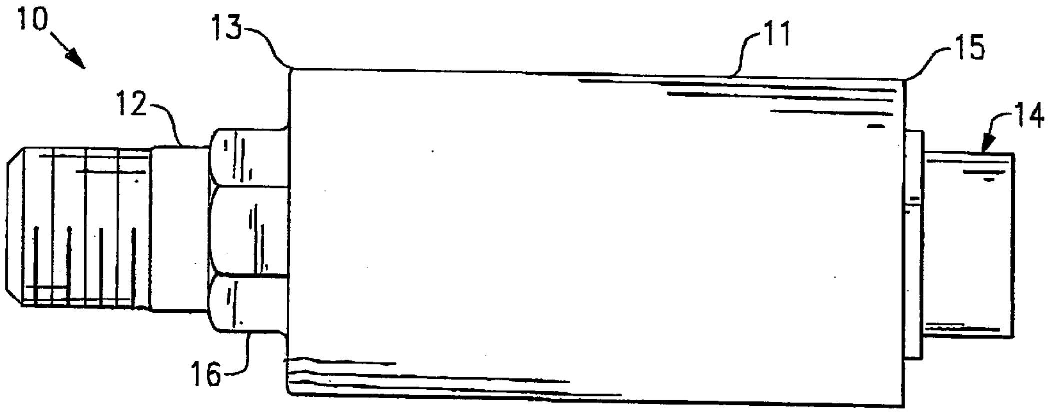
FIG. 2 is a plan view of a filter housing showing the details of the threaded female connector portion.

FIG. 2 shows a filter housing in accordance with a preferred embodiment of the present invention, with particular emphasis on the threaded female connector portion 10 thereof. The filter housing includes a body 11, which is preferably cylindrical, having the threaded female connector portion 10 positioned on one end thereof. The threaded female connector portion 10 includes a base 12 connected directly to a first end 13 of body 11. A male connector portion 14 is connected to a second, opposed end 15 of body 11. A drive member 16 is disposed proximate base 12 of threaded female connector portion 10.

The span or diameter of body 11 is assumed to be Y, which is on the order of ¾" to 1". The drive member 16 has a span that is assumed to be X, which is the same as the span of the cable connector (e.g., an F-connector) terminating the end of the cable line. In a practical example, X is equal to 7/16", as most cable connectors in the field have a span of 7/16".

As used herein, the term "span" refers to the distance between two opposed flat surfaces of the drive member, and, in the case of the cylindrical body, refers to the diameter thereof.

While the preferred embodiment shows the drive member taking the shape of a hexagon, it should be appreciated that the drive member need only consist of two opposed, substantially parallel flats separated by a distance which is substantially equal to X. It is preferred, however, that the span of the drive member equal 7/16", to match the span of the hexagonal nuts typically found on conventional cable connectors.

While drive member 16 is depicted in FIG. 2 as being flush with first end 13 of cylindrical body 11, it should be appreciated that drive member 16 could be spaced anywhere along threaded female connector 10, as long as the position of drive member 16 does not interfere with securing the cable connector to the filter housing.

While the present invention has been particularly shown and described with reference to the preferred mode as illustrated in the drawings, it will be understood by one skilled in the art that various changes in detail may be effected therein without departing from the spirit and scope of the invention as defined by the claims.

What is claimed is:

1. A method of installing an electrical signal filter between another device and a cable terminated with a 7/16" cable connector, a housing of the electrical signal filter having a span which is substantially greater than 7/16" and a threaded female connector portion formed integrally with one end of the housing, said method comprising the steps of:

(a) providing a tool having an engaging span of 7/16";

(b) using said tool to engage a drive member, having a 7/16" span, positioned proximate of the threaded female connector portion and formed integrally with the filter housing, said filter housing having a said span substantially greater than 7/16";

(c) rotating the filter housing by using said tool to secure the filter to another said device;

(d) using said tool to engage the cable connector terminating the cable; and (e) rotating the cable connector by using said tool to secure the cable to the filter.

2. The method of claim 1, further comprising, between steps (c) and (d), the steps of:

(i) providing a second tool having an engaging span 7/16";

(ii) using said second tool to engage said drive member; and (iii) holding said second tool to prevent substantial rotation or the filter during step (e).

3. The method of claim 1, wherein said drive member includes at least two flat sides in substantial parallel relation to one another.

4. The method of claim 1, wherein said drive member is hexagonal.

5. The method of claim 1, wherein the filter housing is cylindrical.

* * * * *

UNITED STATES PATENT AND TRADEMARK OFFICE

CERTIFICATE OF CORRECTION

PATENT NO. : 6,829,813 B2
DATED : December 14, 2004
INVENTOR(S) : Joseph A. Zennamo and Joseph N. Maguire It is certified that error appears in the above-identified patent and that said Letters Patent is hereby corrected as shown below:

Column 4,
Line 34, delete “a” after “having”
Line 37, delete “said” after “another” and add -- said -- after “to”
Line 44, add -- of -- after “span”
Line 48, change “or” to -- of --

Signed and Sealed this

Seventh Day of June, 2005

JON W. DUDAS
*Director of the United States Patent and Trademark Office*